April 25, 1950        W. L. JACKE        2,505,119
AUTOMATIC ELECTRIC TIME-CONTROLLED MECHANISM
Filed Sept. 21, 1945        5 Sheets-Sheet 1
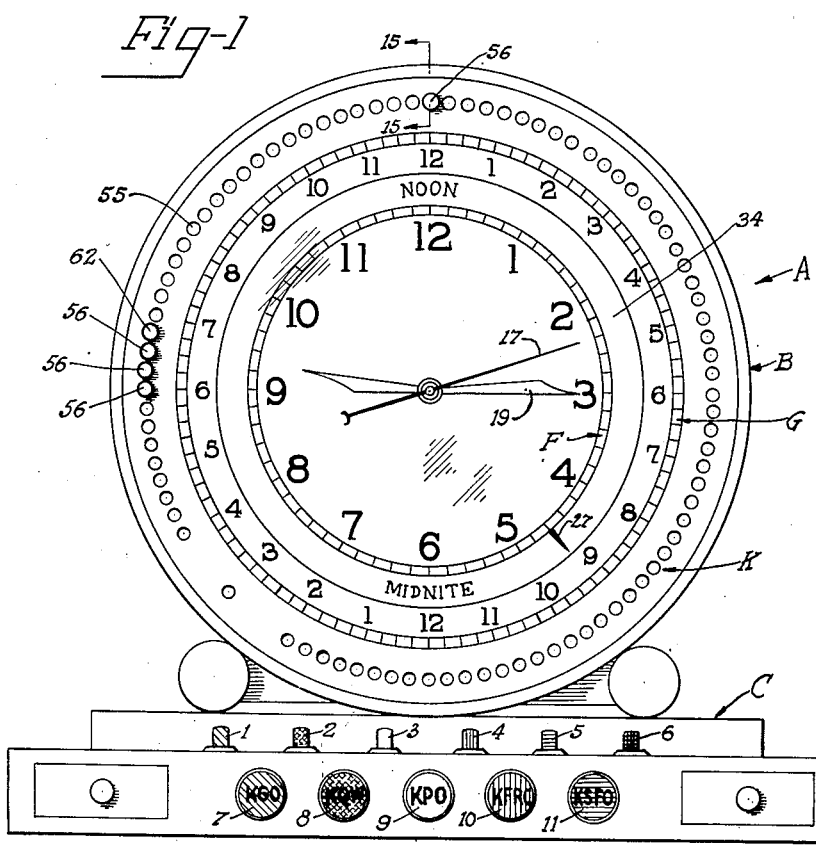
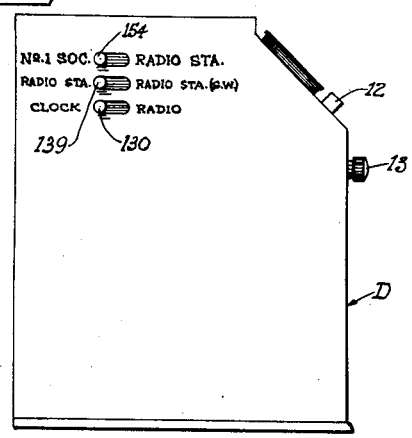
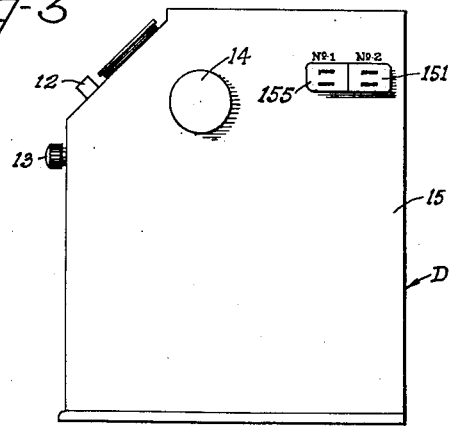
INVENTOR
WILLIAM L. JACKE
BY
Munn, Liddy & Blacum
ATTORNEYS April 25, 1950 W. L. JACKE 2,505,119
AUTOMATIC ELECTRIC TIME-CONTROLLED MECHANISM
Filed Sept. 21, 1945 5 Sheets-Sheet 2
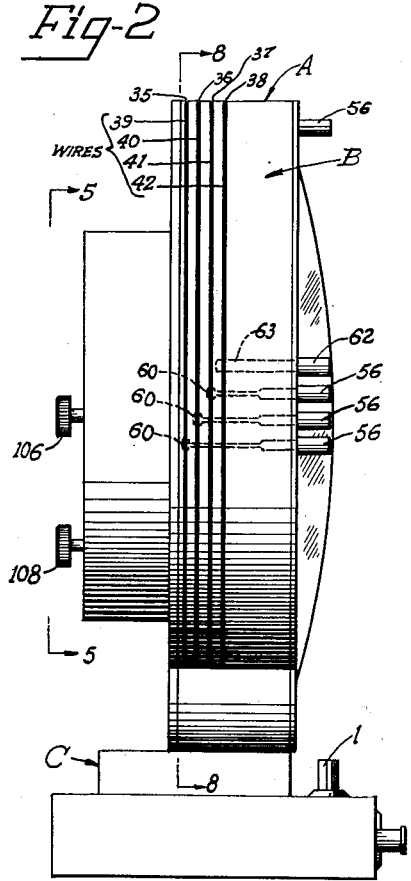
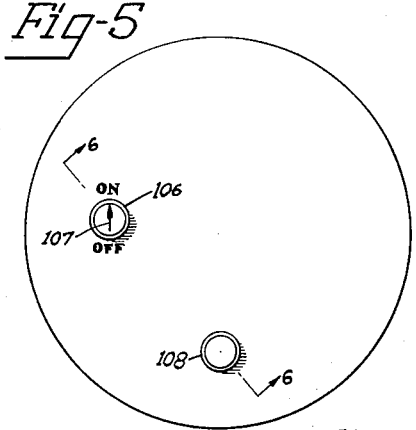
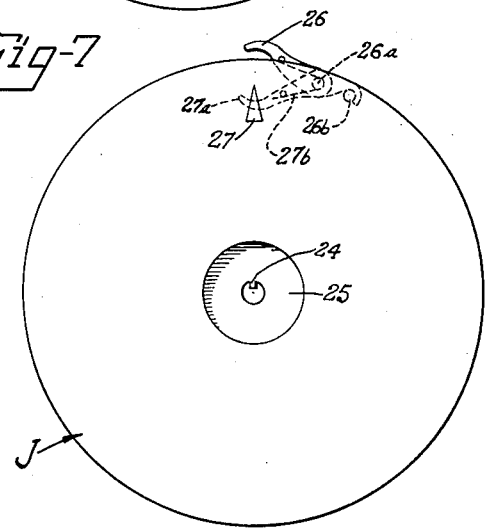
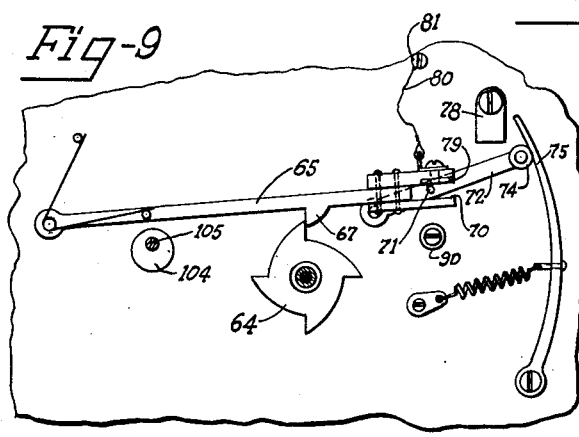
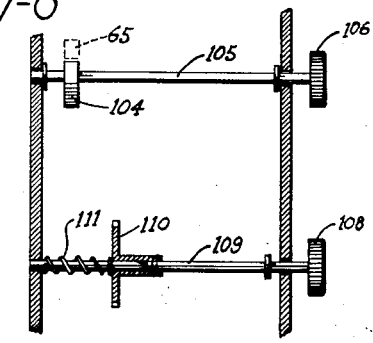
INVENTOR
WILLIAM L. JACKE
BY
ATTORNEYS April 25, 1950  W. L. JACKE  2,505,119
AUTOMATIC ELECTRIC TIME-CONTROLLED MECHANISM
Filed Sept. 21, 1945  5 Sheets-Sheet 3
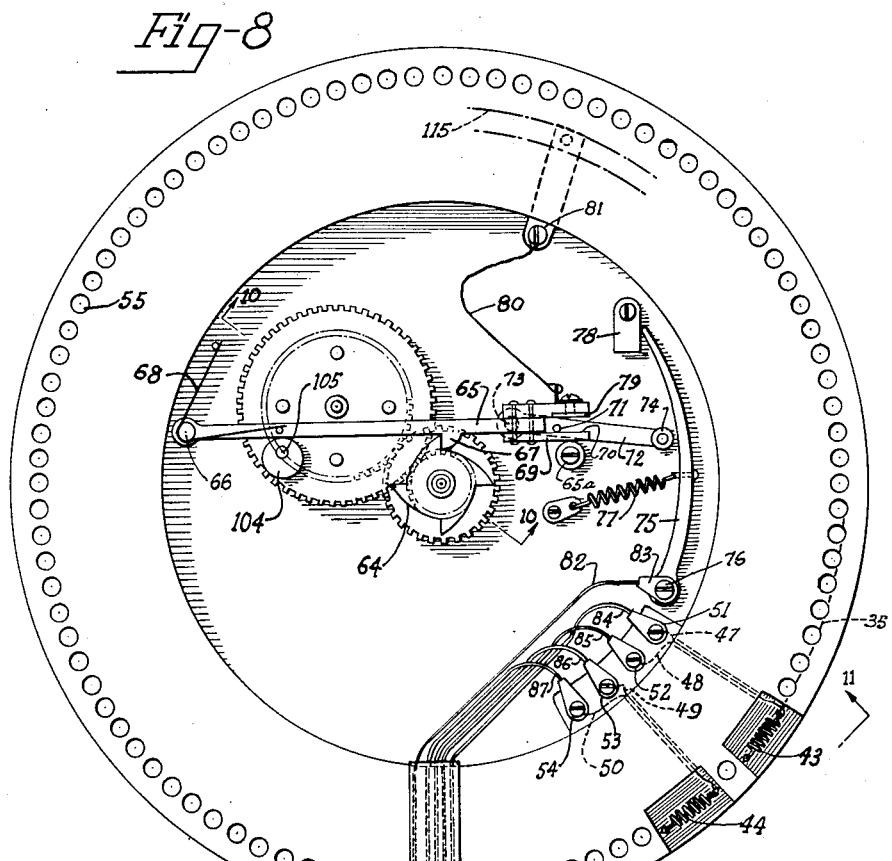
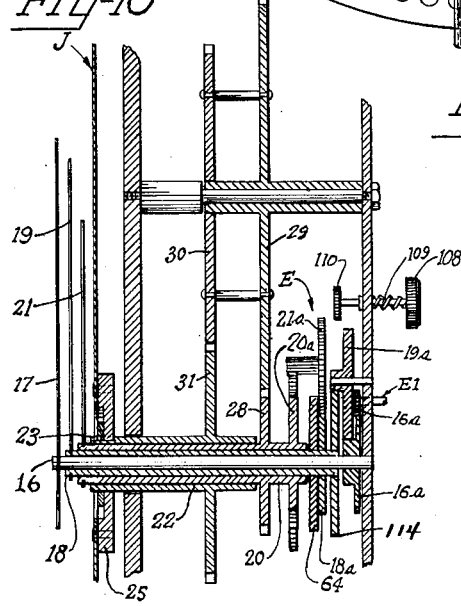
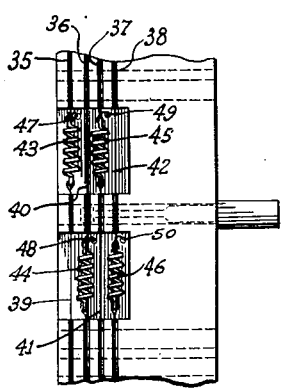
INVENTOR
WILLIAM L. JACKE
BY
Munn, Liddy & Glaccum
ATTORNEYS

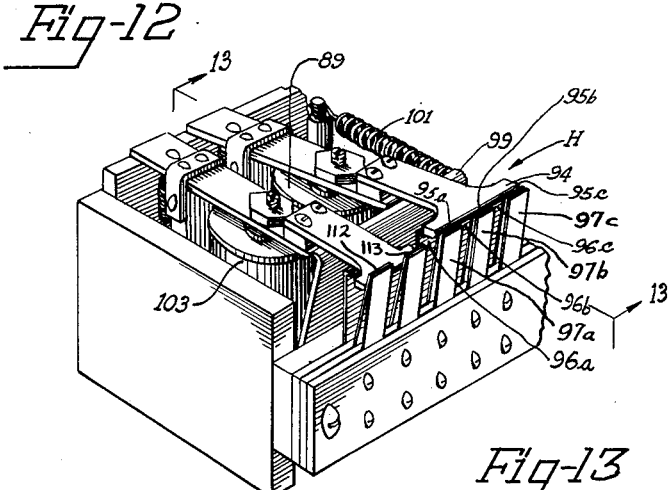
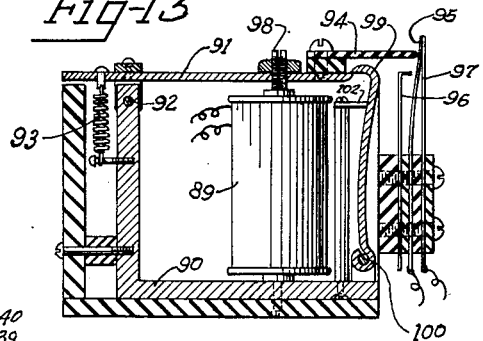
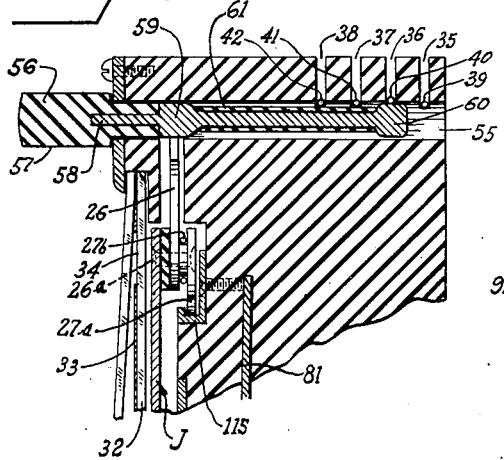
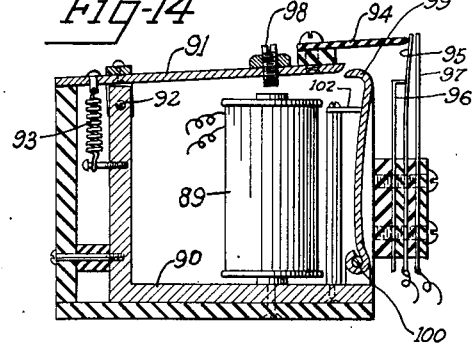

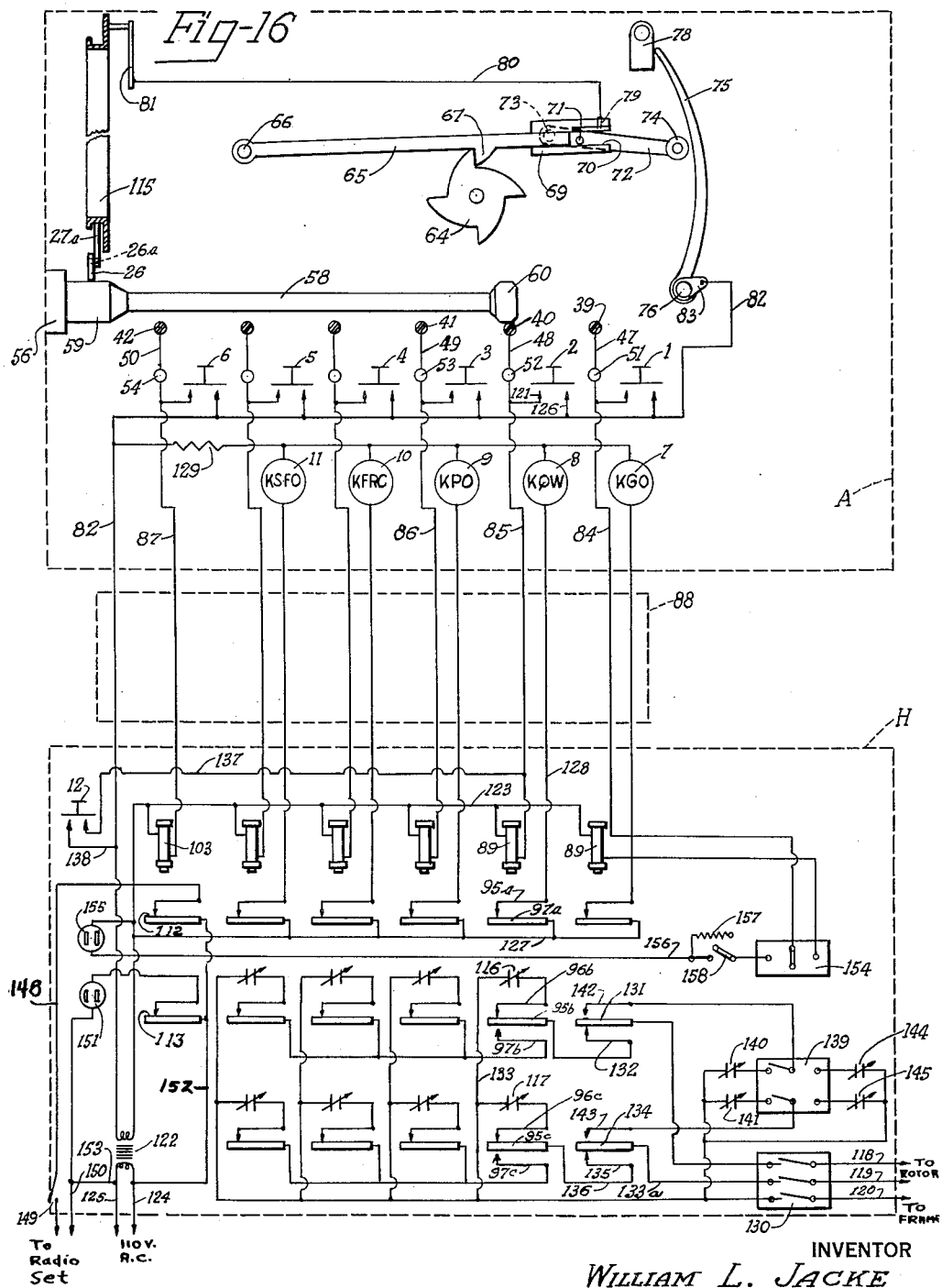

Patented Apr. 25, 1950

2,505,119

UNITED STATES PATENT OFFICE 2,505,119

AUTOMATIC ELECTRIC TIME-CONTROLLED MECHANISM

William L. Jacke, San Jose, Calif.

Application September 21, 1945, Serial No. 617,832

3 Claims. (Cl. 161—1)

An object of my invention is to provide an automatic electric time mechanism by which pre-selected radio stations may be automatically tuned in and turned off at predetermined time intervals day and night. The mechanism may be made a part of the radio set itself or it may be placed at a distance away from the radio set, as for example, on top of the radio set or in another room. This will permit the radio to be operated by a remote time control. The mechanism permits the radio set to be manually operated if the operator so desires from the radio set itself or from push buttons associated with the clock.

A further object of my invention is to provide means or mechanism of the character described which can be used for automatically turning on and off at pre-selected time intervals all forms of electrical utilities or apparatus, such as electric lights, electric mixers, coffee percolators, ovens, furnaces, air conditioning systems, washing machines, etc.

Another object of my invention is to provide means or mechanism of the type described, which will momentarily make and break an electrical circuit at predetermined time intervals, for the operation of all forms of electrical apparatus, such as magnetic coils, magnetic switches, electric lights, signals, gongs, bells, etc., which require small voltages and which require such momentary operation in order to prevent overheating and burning of such coils.

Other objects and advantages will appear in the following specification, and the novel features of the device will be particularly pointed out in the appended claims.

My invention is illustrated in the accompanying drawings forming a part of this application, in which:

Figure 1 is a front elevation of the automatic electric time clock;

Figure 2 is a side elevation of Figure 1;

Figure 3 is an end view of a radio receiver used in connection with the clock;

Figure 4 is a view of the opposite end of the radio receiver;

Figure 5 is a rear view of a portion of the clock shown in Figure 2 when looking in the direction of the arrows 5—5 of Figure 2;

Figure 6 is a transverse section taken along the line 6—6 of Figure 5;

Figure 7 is a front elevation of the twenty-four hour disc and movable switch used in connection with the apparatus;

Figure 8 is an enlarged transverse section of the clock taken along the line 8—8 of Figure 2;

Figure 9 is a view of the switch illustrated in Figure 8, but showing it in closed position;

Figure 10 is a transverse section taken along the line 10—10 of Figure 8;

Figure 11 is an end view of a portion of the clock shown in Figure 8 when looking in the direction of the arrows 11—11 of this figure;

Figure 12 is an isometric view of a portion of the bank of electric relays used with the mechanism;

Figure 13 is a transverse section taken along the line 13—13 of Figure 12, showing the relay closed;

Figure 14 is a view similar to Figure 13, but shows the relay open;

Figure 15 is an enlarged transverse section taken along the line 15—15 of Figure 1; and Figure 16 is a wiring diagram illustrating the various circuits.

While I have shown only the preferred forms of my invention, it should be understood that various changes or modifications may be made within the scope of the appended claims without departing from the spirit and scope of the invention.

In carrying out my invention, I will first describe the automatic electric time clock and then the bank of relays and finally the wiring diagram illustrating how the clock can automatically tune in different pre-set radio stations at any time of the day or night and how the apparatus can be used for automatically operating utilities and other electrical mechanisms.

The automatic electric time clock is shown generally at A in Figure 1. The clock mechanism is housed in a casing indicated generally at B and the casing is mounted upon a pedestal or base indicated generally at C.

The base has a plurality of push buttons 1, 2, 3, 4 and 5 for tuning in by remote control different radio stations and a push button 6 for turning the radio off. The push buttons 1 to 5 inclusive, are of different colors and are associated with lights 7, 8, 9, 10 and 11, which have corresponding colors and the lights have the call letters of the radio stations printed thereon. For example, push button 1 is green in color and the light 7 is also green. The push buttons 2, 3, 4 and 5 are respectively orange, white, red, and blue in color, and the lights 8, 9, 10 and 11 are given corresponding colors. I do not wish to be confined to any particular color. The "Off" push button is made black in color.

In Figures 3 and 4 I show a radio receiver indicated generally at D and this receiver is of the usual construction and may have similar push buttons 12 for automatically tuning in the desired radio stations. The radio receiver is also equipped with a tuning knob 14, see Figure 3, mounted on the end 15 of the radio casing, for manually tuning in any desired station other than those pre-set on the clock or on the push buttons. The radio "Off-On" switch and volume control knob 13 is mounted on the front of the radio set.

By electrical and mechanical means hereinafter described, the desired radio station can be tuned in by pressing any one of the buttons 1 to 5, inclusive, associated with the clock rather than the push buttons 12, on the radio receiver D. Variable padding condensers are in the different radio circuits so that the stations will be tuned in with the desired intensity of sound as soon as the push button is depressed. This will be explained more fully hereinafter.

It is best to describe the construction of the automatic electric time clock at this time. A side view of the clock casing B is illustrated in Figure 2. The clock has the usual clock gears indicated generally at E in Figure 10 and the gears are operated by an electric synchronous motor (not shown) which may be of the self-starting type. Referring to Figure 10, I show the electric motor shaft E1 operating a central shaft 16 through gears 16a and the shaft has a sweep second hand 17 mounted on its front end. This hand is movable over a twelve-hour clock dial indicated generally at F in Figure 1. A hollow shaft 18 is rotatably mounted on the shaft 16 and the hollow shaft carries a minute hand 19. Gearing 19a connects the shaft 16 to the shaft 18. A second hollow shaft 20 is rotatably mounted on the hollow shaft 18 and carries an hour hand 21. Gearing 21a and 20a connects the two shafts 18 and 20 together. The parts thus far described are standard for the usual electric clock.

On the shaft 20, I mount a third hollow shaft 22 and this shaft has a key-way 23 for receiving the key 24, see Figure 7, of a hub 25 on a disc J that in turn carries a movable switch, hereinafter described. This disc J and movable switch are designed to make one revolution every twenty-four hours. It will be seen from Figure 7 that the disc J has a triangular-shaped pointer 27 and this pointer moves around a twenty-four hour dial, indicated generally at G in Figure 1. In Figure 10 I show a gear 28 mounted on the hollow shaft 20 and meshing with a large gear 29. The gear 29 in turn has a smaller gear 30 connected thereto so as to rotate therewith and the gear 30 meshes with another gear 31 which is secured to the hollow shaft 22 so as to rotate the latter. The ratio of the four gears 28 to 31, inclusive, is such as to cause the hollow shaft 22 to rotate at one-half the speed of the hollow shaft 20.

In Figure 15 I show the disc J rotatably mounted in back of a disc 32 that has the twelve and twenty-four hour dials F and G printed thereon. The disc 32 is made of transparent material, but the disc is covered with thin opaque paint, indicated at 33 and this layer of paint covers the disc 32 with the exception of a circular strip 34 that is free of paint and therefore the disc 32 is transparent at this place. The triangular pointer 27 on the disc J moves along in back of this transparent circle and shows through the transparency so as to indicate the time on the twenty-four hour dial G. For example, in Figure 1, the time on the dial F is shown at 9:15 and the pointer 27 indicates the same time on the twenty-four hour dial G, but shows whether this time is between noon and midnight or between midnight and noon.

I will now set forth the electrical mechanism whereby the clock controls the turning on and off of the radio set D and for turning on the various pre-set radio stations represented by the lights 7 to 11, inclusive, in Figure 1, these stations being turned on for any time period desired by the operator. In Figure 2 I show a plurality of annular grooves 35, 36, 37 and 38, in the periphery of the clock casing, the grooves 35, 36 and 37 being associated with the lights 7, 8 and 9, see Figure 1. In actual practice, there will be two additional grooves for the lights 10 and 11, but for the sake of clarity these have been omitted in the present drawings. The groove 38, Figure 2, is associated with the "Off" push button 6, Figure 1.

Figure 15 shows the grooves 35, 36, 37 and 38 in section and on a larger scale and illustrates a ring-shaped conductor wire placed in the bottom of each groove, these wires being numbered 39, 40, 41 and 42, respectively. Figure 2 illustrates how the wires are received in the grooves and Figure 11 shows how the ends of the wires are yieldingly held together by coil springs. A coil spring 43, see Figure 11, holds the ends of the wire 39, Figure 2, together and a coil spring 44 holds the ends of the wire 40 together. In like manner, a coil spring 45 holds the ends of the wire 41 together, and a coil spring 46 holds the ends of the wire 42 together. Each wire 39 to 42, inclusive, is connected by wires 47, 48, 49 and 50, respectively, to terminals 51, 52, 53 and 54, respectively, see Figures 8 and 11.

A plurality of openings or bores 55, see Figures 1 and 8, are arranged around the clock casing, each successive bore representing a fifteen minute time interval. The bores extend from the front of the casing through to the rear wall, as shown in Figure 15, and the bores are arranged opposite the fifteen minute graduations on the twenty-four hour dial G, see Figure 1. The bores are designed to removably receive radio station indicating plugs shown generally at 56, Figures 1 and 15. The plugs are of the construction shown in Figure 15 and comprise a colored insulating handle 57, and a metal portion 58, this portion having an enlarged base 59 constituting an electrode and an enlarged head 60 constituting a second electrode. The plugs have their metal portions 58 of different lengths so that when the plugs are inserted in place in any of the bores 55 desired, the heads will contact with the proper circular wires 39 to 42, inclusive. The plug shown in Figure 15 has its head 60 contacting with the wire 40 and this wire is associated with groove 36, which corresponds to the orange light 8 with the radio station letters KQW thereon, and the orange push button 2. The handle 56 for the plug that contacts with the wire 40 will therefore be colored orange. In Figure 2, I show three plugs of different lengths so that their heads 60, see Figure 15, will contact with three wires 39, 40 and 41.

Figure 15 illustrates how the bores 55 cut through the bottoms of the grooves 35 to 38, inclusive, so that the wires 39 to 42, inclusive, lying in the grooves, will be contacted by the plug heads 60 when the plugs are placed in the bores.

In order to prevent any other portion of the metal 58 of the plug from being contacted by the wires, I provide the reduced portion of the metal 58 with an insulating sleeve 61. The plug handles 57 are colored in accordance with the push buttons 1 to 5, inclusive, and with the lights 7 to 11, inclusive, so that if a person wishes station KGO, for example, to come on at 6:00 o'clock in the morning, he places a plug 56, with a green handle, in the opening 55 corresponding to the 6:00 A. M. position. Figures 1, 2 and 15 show how the head 60 of the plug will extend to the wire 39 for aiding in completing an electric circuit which will be hereinafter described.

If desired, in the very next opening, corresponding to a lapse of fifteen minutes, or 6:15 A. M., a second plug 56 may be placed in the bore 55 and its head 60 will contact with the wire 40 in the groove 36. The handle of this plug may be orange and will correspond to the orange push button 2 and the orange light 8, which stands for radio station KQW. In like manner a third plug 56 may be placed in the bore 55 representing 6:30 A. M. and the head 60 of this plug will contact with the wire 41 in groove 37 to correspond with the white push button 3 and station KPO, indicated by the white light 9.

An "Off" plug 62 having a black handle and representing the "Off" push button 6 may be placed in the bore 55 representing 6:45 A. M. The "Off" plug 62 shown in Figure 2, is shorter than the other plugs and has a metal shank 63 that extends to the wire 42 placed in the groove 38. When the clock indicates the time 6:45, the "Off" plug will disconnect the radio so as to stop it from operating. It will be seen from this that a different station can be automatically tuned in every fifteen minutes and the "Off" plug may be placed in any bore 55 desired. It is also possible to have one station remain on for a much longer period of time rather than for the clock to tune in a different station every fifteen minutes. This is accomplished by merely placing the right plug for the desired radio station in the proper bore and leaving the succeeding bores empty for as long a time period as it is desired to keep the radio playing. An "Off" plug can be placed in the bore representing the time when it is desired to turn off the radio or a different plug representing another station may be placed in the bore for tuning in another station.

I will now describe the switch mechanism on the clock, which cooperates with the plugs 56 to tune in the radio stations. In Figure 10, I show the hollow shaft 18, on which the minute hand 19 is mounted, provided with a four-tooth cam 64. The cam 64, see Figure 8, will make one complete revolution every hour and each tooth of the cam represents a fifteen minute interval. By substituting cams with more or less teeth, and changing the bores, the time intervals may be changed. The cam will rotate in a counter-clockwise manner when looking at Figure 8. An elongated arm 65 is pivoted at 66 and the arm carries a cam follower 67, which is yieldingly held in contact with the cam by a torsional spring 68. A rotation of the cam will lift the arm 65 every fifteen minutes and will permit the arm to suddently drop until it strikes an adjustable stop 65a when the fifteen minute interval has transpired. The cam is arranged on the clock mechanism so that its four teeth correspond with the three quarter hour intervals on the clock and for the hour itself. For example, in the showing of the four plugs in Figures 1 and 2, the cam 64, see Figure 8, will permit the arm 65 to drop at 6:00 A. M., 6:15, 6:30 and 6:45 A. M. This successive dropping of the arm every fifteen minutes is repeated throughout the twenty-four hours of each day.

The arm 65, see Figure 8, carries a clevis 69 made of insulating material and having a recess 70 for loosely and slidably receiving a pin 71 mounted on a switch arm 72. The switch arm 72 is pivoted at 73 and has a contact roller 74 at its free end designed to wipe along an arcuate electrode 75 that is pivotally mounted at 76. An adjustable spring 77 yieldingly urges the electrode 75 against an adjustable stop 78.

The pin 71 is of a smaller diameter than the width of the slot 70 and the pin normally contacts with the insulated portion of the clevis on the upward movement of arm 65 and is held out of contact with a plate electrode 79, forming the upper wall of the clevis. A flexible electric wire 80 connects with the plate 79 and with a terminal 81. Another wire 82 connects with the electrode 75 by means of a terminal 83. Wires 84, 85, 86 and 87 are connected to the terminals 51 to 54, inclusive, and with the wire 82 are carried in a flexible insulating casing 88.

The flexible insulating casing 88 carries the wires to the push buttons in the base of the clock and thence to a bank of relays indicated generally at H and illustrated in Figures 12, 13 and 14. The bank of relays may be placed in the cabinet in the radio set D if desired. Since each relay in the bank is of identical construction, a description of one will suffice for all. The particular manner of electrically connecting the relays with the clock and with the radio circuit in the radio set, will be illustrated in the wiring diagram shown in Figure 16. In Figures 12 and 14 I show a relay comprising a magnetic coil 89 mounted in a metal frame 90 and the frame has an armature 91 pivotally mounted thereon at 92 and held in raised position by a coil spring 93. The front end of the armature carries an insulating wiper element 94 that is designed to contact with three switch terminals 95a and 95b and 95c, and to force these terminals out of electrical contact with terminals 96a, 96b and 96c, and into electrical contact with terminals 97a, 97b and 97c, see Figure 13, when the armature is attracted by the magnet. The purpose of the switch will be explained later. An adjustable set screw 98 limits the movement of the armature into closed position and prevents appreciably any chatter or humming sound when the current is flowing momentarily through the magnet.

A spring actuated keeper 99 of the shape shown in Figures 13 and 14 is pivotally mounted at 100 and is yieldingly urged to the left by a spring 101, see Figure 12. An adjustable stop 102 limits the movement of the keeper to the left in Figures 13 and 14. The shape of the keeper is such that when an armature is attracted by its magnet, the downward movement of the armature will strike the curved end of the keeper and move the keeper to the right as the armature passes it. The keeper 99 is common to all of the relays in the bank and therefore a movement of the keeper to the right will free any armature that is in closed position before the new armature completes its swing into closed position. The spring 101, see Figure 12, will then pull the keeper back into the position shown in Figure 13 and will hold the armature 91 in closed position.

I make use of this arrangement for switching from one radio station to another and for turning off the radio receiver. There is one relay for each station and in the present form of the invention, I show five stations and therefore there will be five relays. However, I do not wish to confine myself to this number, as more or less relays may be employed for more or less stations desired. Each of these relays has three switches, the purpose of which will be hereinafter set forth when describing the wiring diagram.

I provide a stop relay, and the magnet 103, see Figure 12, for this relay when energized will operate its switch for shutting off the radio. This relay has only two switches 112 and 113 and they are of the single pole, single throw type. The function of these two switches will be described when explaining the wiring diagram shown in Figure 16. In all other respects, the stop or "Off" relay functions in the same manner as the other relays.

When it is desired to manually set the hands of the electric clock, the arm 65, see Figures 8 and 9, is lifted so as to disengage the cam follower 67 from the cam 64. This will permit the clock hands to be rotated clockwise or counter-clockwise. To accomplish this, I provide an eccentric 104, see Figures 6, 8 and 9, on a shaft 105, and the shaft has a knob 106 that projects beyond the rear of the clock casing. The knob has an arrow 107, see Figure 5, marked thereon and the rear of the clock casing has the words "On" and "Off" printed thereon adjacent to the knob.

When the arrow points to "On" the eccentric 104 is in its inoperative position and the arm 65 is free to be actuated by the cam 64, see Figure 8. A turning of the knob 106, see Figure 6, to swing the arrow 107, see Figure 5, to point toward "Off" will lift the arm 65 so that the cam follower 67 will be lifted above the cam 64. The hand setting knob 108, see Figures 6 and 10, may now be pressed inwardly to move its shaft 109 and gear 110 against a spring 111 to compress it, this movement bringing the gear 110 into mesh with a gear of the gear train 21a in the clock mechanism E. A rotation of the knob 108 to the right or left while it is still held depressed will actuate the clock gearing train 21a in the usual manner to set the hands and indicate the correct time. The gear train 21a includes a minute gear 18a mounted on the hollow shaft 18 and an hour gear 20a mounted on the hollow shaft 20.

As soon as the correct time is indicated, the knob 108 is freed and the spring 111 will disengage the gear 110 from the gear train 21a. The knob 106 is now turned from "Off" to "On" position so that the cam 64 will again engage with the cam follower 67. The shaft 18 has another gear 114, see Figure 10, frictionally connected thereto and being rotated by gear trains 19a, 16a, and the electric motor shaft E1.

Before describing the wiring diagram in detail it is best to mention the electric switch carried by the disc J and illustrated in Figure 7. A lever electrode 26 is pivoted to the disc at 26a and a hook-shaped end contacts with a pin 26b to prevent the lever from swinging in a clockwise direction. An arm 27a is also pivotally mounted on the same pin 26a and has its end yieldingly held away from the end of the lever by a torsional spring 27b. Figure 15 shows the disc J moving the arm 26 of the switch into contact with bases 59 of successive plugs 56 that have been placed in the bores 55. The other switch arm 27a slides in an annular trough 115 that is electrically connected to the wire 80 by the conductor 81, see Figures 8, 15 and 16. The switch 26 is carried through one complete revolution by the disc J every twenty-four hours.

I will now describe the wiring diagram of Figure 16. It will be seen that the electrical circuit is divided into the clock unit A and the relay unit H, both being interconnected by the flexible cable 88 having twelve conductors therein. Five of these conductors have already been mentioned and they are the wires 82, and 84 to 87, inclusive. I also make use of a conventional radio receiving set shown at D and having a two section variable tuning condenser, not shown. Each of the stations to be tuned in by my clock or by the push buttons 1 to 5 inclusive makes use of two pre-tuned ceramic padding or trimmer condensers.

Since the example of tuning already given is for radio station KQW, I will describe how the pressing of the button 2 or the use of the plug 56 having the orange handle representing the same station will tune in the station on the radio receiver D. The two pre-tuned ceramic padding condensers for station KQW are shown at 116 and 117 in Figure 16. These two condensers are each connected across a section of the two gang tuning condenser through their corresponding relay switch 89. The leads to the rotor sections of this tuning condenser are shown at 118 and 119. The other side of these padding condensers are grounded to the frame of the radio set as shown at 120.

I do not wish to confine my apparatus to the use of the particular means of tuning disclosed because other forms of automatic tuning may be used in combination with my electric clock such as that described in my patent on an Automatic radio tuning control, Patent No. 2,297,152, issued September 29, 1942. My apparatus may be employed for automatically adjusting other devices and forms of mechanism to a predetermined setting at pre-set time intervals.

For the purpose of illustration, I shall describe the circuit and action of the various components in tuning in radio station KQW together with its associated push button 2, the light 8, and the associated magnetic coil 89. By inserting KQW station plug 56, Figure 15, with its orange handle 57, into bore 55, representing 9:15 A. M. on the twenty-four hour dial G, see Figures 1 and 2, contact is made by the plug head 60, see Figure 16, with its associate wire 40. The wire 40 is connected by wire 48 to the terminal 52, and the wire 85 leads from the terminal to one side 121 of the associated push button 2. The wire 85 also leads to one side of the coil 89 associated with the wire 40.

The other side of the relay coil 89 is connected to a transformer 122 by a wire 123, the transformer in turn being connected to a 110 v. house current. It will be seen that an electrical circuit is created from the A. C. source of supply at wire 124, through the transformer 122, thence through the magnetic coil 89 for station KQW. and continuing through wire 85 to wire 40. From here the current flows through the KQW station plug 56 to moving switch 26 carried by disc J and then to the ring-shaped conductor strip 115, conductor 81, wire 80, the double cam-controlled switches 71 and 74, electrode 75, wire 82, and back to the transformer 122 and the other side 125 of the A. C. source of current. Of course the circuit is actually closed when the clock indicates 9:15 A. M. and the plug 56 contacts wire 40 and switch 26 and when the cam 64 permits the arm 65 to drop and momentarily close the two switches 71 and 74 which are in series with each other. The moving switch 26 makes continuous contact with the ring 115 that is trough-shaped in cross section, see Figure 15, and contact with the plug 56 at the time of 9:15 A. M.

The magnetic coil 89 for station KQW is energized electrically by means of the circuit momentarily established therethrough by the two switches 71 and 74 which are in series with each other. The electrical circuit is broken in two places by the immediate opening of the two switches 71 and 74. This makes the switches accurate and fool-proof. The action is the same for all of the relay coils 89.

It will be noted that the relay 89 will be energized when the push button 2 is depressed. The push button connects the wire 121 with a wire 126 that is connected to the wire 82. This closes a circuit from the transformer 122, wire 123, coil 89, wire 85, wires 121 and 126 electrically connected together by the depressed push button, wire 82 and back to the transformer. The coil 89 is energized in the same manner as when the clock mechanism automatically closes the circuit to the coil.

The relay 89 for station KQW has a set of spring contacts 95a and 97a which are closed when the relay is energized. An electric circuit to the light 8 is established and will flow from the transformer 122 through wire 127 to the closed spring contacts 95a and 97a and thence through a wire 128 to the light 8. From the light the current flows through a resistor 129 to reduce the current flow and the current returns to the other side of the transformer through the wire 82. The light 8 will be lighted when either the clock or the push button 2 closes the circuit to the relay coil. The call letters KQW of the radio station will stand out when the light 8 is illuminated and will show what station is tuned in.

I will now explain the other electrical circuits closed when the magnet 89 is energized. The relay for station KQW has two sets of spring contacts, each comprising a double pole, double throw switch for the purpose of connecting into the circuits the pre-set padding condensers 116 and 117. One set of spring contacts are shown at 95b, 96b and 97b, while the other set is shown at 95c, 96c and 97c. When the relay for KQW is energized, the other relays will be automatically opened as already described.

The electric circuit is as follows: The current will flow from one section of the rotor plates of the radio variable condenser, not shown and will enter wire 118, thence across switch 130, contacts 131 and 132 on the relay for stations KGO which are closed when the station is not tuned in, through contacts 95b and 96b of the relay KQW which are closed by the energizing of this relay, and thence to one side of the pre-set padding condenser 116 which has been pre-tuned to station KQW. The current then flows through wire 133 to switch 130 and wire 120 that connects with the radio frame, thus completing the circuit.

In like manner, the second padding condenser 117 is connected into its circuit as follows: The current will flow from the other section of the radio rotor plates through wire 119, switch 130, wire 133a, closed contacts 134 and 135 of the relay for KGO, thence through wire 136 to the closed contacts 95c and 96c of the relay for KQW, and on to one side of the padding condenser 117. The current returns from condenser 117 by means of the wire 133, switch 130, and wire 120 back to the radio frame.

By these two circuits, both padding condensers 116 and 117, pre-tuned to station KQW are automatically connected into the radio circuit for tuning in the station. In like manner the other padding condensers for the other radio stations will tune in their particular stations when their relays are energized either by the push buttons or by the electric clock.

The switch 130 is of the triple blade, single throw type and is placed at one end of the radio casing D as illustrated in Figure 4. In this figure the switch is moved to the left or into "Clock" position and this means that the electric clock will tune in the radio stations automatically at any time desired. When the switch is thrown to the right or "Radio" position, it will disconnect all padding condensers from the radio set and will permit the operator to manually operate the radio receiver in the usual manner. The switch 13 turns on the set and controls the volume while the knob 14 gives dial control for tuning in the desired station. In addition the push buttons 12 may be pressed. One of these is shown in Figure 16 as being associated with station KQW by a wire 137 connected to the wire 85 and a second wire 138 connected to the wire 82. A depressing of the button 12 will energize the magnet 89 for station KQW in exactly the same way as when the button 2 on the clock base is depressed.

It may be desirable to have one of the push buttons 1 to 5 inclusive tune in either one of two possible radio stations. I have shown in Figure 16 the relay 89 associated with station KGO provided with means for tuning in a station other than KGO when the button 1 is depressed or when the clock automatically closes a circuit which energizes the KGO relay. I use a double throw switch shown at 139 in Figures 4 and 16. The padding condensers 140 and 141 are connected into circuits which will tune in station KGO when the switch 139 is moved to the left or "Radio station" position and when either the push button 1 or electric clock energize the relay associated with this station. Contacts 131 and 142 will be closed and so will contacts 134 and 143 be closed.

By moving switch 139 to the right or "Radio station short wave" position, another set of padding condensers 144 and 145 are brought into the circuits and tune the radio set to bring in police calls or any other long or short wave radio station. In this way the time clock can tune in substituted radio stations at any desired time if desired. All of the other relays may be provided with additional pairs of padding condensers for permitting the time clock to tune in twice the number of radio stations as indicated by the push buttons 1 to 5, inclusive.

I will now describe the operation of the On-Off relay switch shown at 103 in Figures 12 and 16. The relay is energized when either the "Off" push button 6 is depressed or when the clock reaches a time represented by a black handled plug 62 placed in one of the bores 55. Relay 103 actuates a double pole, single throw switch shown at 112 and 113 to open them and these switches are in series with the A. C. line wire 124. The inner contacts of this relay shown in Figure 12 are used as electrodes. By this I mean that the intermediate electrode (corresponding to the electrode 95 of the other relay switches) and the electrode nearest the relay (corresponding to the electrode 96 of the other relay switches) are the two electrodes forming the switch 112, and are closed when the relay 103 is not energized and the armature for relay 103 is in raised position. When the relay 103 is not energized, the current will flow as follows: From the line 124 to switch 112, which is closed, and then through wire 148 to the On-Off switch 149, thence to the radio set and back to wire 150, and back to the wire 125.

When the relay 103 is energized, the switch 112 is opened thereby breaking the circuit between the source of current and the radio receiver and rendering the latter inoperative. As soon as any of the other relays are energized, the armature for the relay 103 will be freed and the radio set will again be connected to the source of current.

The switch 113 like the switch 112 makes use of its intermediate electrode (corresponding to the electrode 95 of the other relay switches) and the electrode nearest the relay (corresponding to the electrode 96 of the other relay switches) and these two electrodes form the switch 113, and are closed when the relay 103 is not energized and the armature for the relay is in raised position. The other switch 113 opened when the relay 103 is energized, is for the following purpose. This switch is in series with an A. C. socket 151 and designated as socket "No. 2" in Figure 3. The socket is connected to the A. C. supply line as shown in Figure 16 and its purpose is to turn on and off at pre-selected time intervals any utility or apparatus such as electric lights, furnace, electric mixers, etc. Any such utility or apparatus may be connected into the circuit by merely plugging it into the socket 151.

As long as the radio set is working, the switch 113 will be closed and current will flow from wire 124 to wire 152, switch 113, socket 151, wire 150, wire 153, and back to wire 125. When the relay 103 is energized, the switch 113 will open and shut off the current flowing to the socket 151. It will be seen from this arrangement that the employment and operation of any utility or apparatus plugged into the socket 151, see Figure 3, will not disturb the operation of the time clock mechanism. The time clock can continue to tune in the various radio stations while current continues to flow to the socket. By turning the radio On-Off switch 149, which is controlled by the knob 13, to the off position, the clock will continue to control and operate the utility or apparatus plugged into the socket 151 while the radio set will remain silent during this operation.

I also provide a switch 154 in Figure 16, and shown again in Figure 4. This is a single pole, single throw switch and is used to disconnect the magnetic coil 89 associated with station KGO, rendering it and its associate spring contacts inoperative, and substituting therefor an outlet socket 155 designated socket "No. 1" in Figure 3. The socket is for the purpose of plugging into it any remotely situated electrical apparatus and/or forms of magnetic coils for the instantaneous or momentary operation thereof, such as electric switches, lights, signals, gongs, etc. Such electrical apparatus requires a small voltage and momentary operation in order to prevent overheating and the burning of a coil.

The arrangement of the circuit is such that an electrical current will be momentarily made and broken due to the operation of the clock switch. The circuit is identical to that described for station KQW or station KGO except that the magnetic coil wire 84 leads to the switch 154 rather than to the coil. When the switch arm is moved to the left as designated by "No. 1 socket" in Figure 4, the current will flow to the socket 155 by means of the wire 156. Similar switches for the other relays may be provided if desired.

A resistor 157 may be provided in the line 156 and when this resistor is connected into the line 156 by another switch 158, the current is reduced from approximately twenty-five volts to six volts. The resistor may be of any capacity to regulate the voltage desired. When the switch 154 is moved to the left to indicate "No. 1 socket," the automatic time clock will actuate and control the operation of any apparatus or mechanism plugged into the socket 155 at pre-selected time intervals. The other side of the socket 155 is connected to the transformer 122.

When the arm of switch 154 is moved to the right or into the position designated "Radio station" in Figure 4, the socket 155 is disconnected from the source of current and the relay 89 associated with the radio station KGO will tune in the station when the relay is energized. The movement of the arm in switch 154 to the left position will not effect the operation of the clock mechanism in tuning the various radio stations shown at 8, 9, 10 and 11, at predetermined time intervals. The KGO plug 56 becomes the plug for the operation of utilities when the arm of switch 154 is moved to the left.

The wiring circuits for the radio stations represented by the lights 9, 10 and 11, are shown in Figure 16, but are not described because they function in the same manner as the relay and associate mechanism for radio station KQW which has been described in detail. All of the relays will be of the same type shown in Figures 12, 13 and 14 except that various electrodes 95a, 96a and 97a will be used according to the circuit desired. The electrodes for the relay 89 associated with the radio station KGO are also the same as that illustrated in Figures 12, 13 and 14, excepting other reference numerals have been used in order to avoid confusion in describing the various circuits.

I claim:

1. In an automatic electric time clock; a dial; a plurality of removable terminals of different lengths; a plurality of terminal-receiving receptacles arranged around the dial and associated therewith for indicating time intervals; a plurality of wires equal in number to the number of radio stations desired to be tuned, these wires extending across the receptacles and being arranged at different depths therein; the removable terminals having enlarged heads at their inner ends for contacting with the desired wires when the terminals are inserted in the receptacles; each wire being formed into a loop and having a diameter substantially the same as the diameter of a circle that lies tangent to the bores formed by the receptacles; and spring means for yieldingly exerting a contacting force on each looped wire for causing each wire to have its loop enlarged slightly when a terminal is placed in one of the receptacles and its head contacts the wire, whereby a yielding electrical contact is made between the head and the wire it contacts.

2. In an automatic electric time clock; a dial; a plurality of removable terminals of different lengths; a plurality of terminal-receiving receptacles arranged around the dial and associated therewith for indicating time intervals; a plurality of wires equal in number to the number of radio stations desired to be tuned, these wires extending across the receptacles and being arranged at different depths therein; the removable terminals having enlarged heads at their inner ends for contacting with the desired wires when the terminals are inserted in the receptacles; each wire being formed into a loop and having a diameter substantially the same as the diameter of a circle that lies tangent to the bores formed by the receptacles; and spring means for yieldingly exerting a contacting force on each looped wire for causing each wire to have its loop enlarged slightly when a terminal is placed in one of the receptacles and its head contacts the wire, whereby a yielding electrical contact is made between the head and the wire it contacts, said spring means including a coil spring for each looped wire, the ends of each looped wire being connected to the ends of its spring so that the spring will tend to contract the looped wire.

3. In an automatic electric time clock, a casing having a cylindrical portion with annular grooves therein, a clock dial, a plurality of terminal-receiving receptacles arranged around the dial and associated therewith for indicating time intervals, the annular grooves being spaced apart and intersecting portions of the receptacles at different depths, a plurality of terminals of different lengths removably receivable in the receptacles, looped wires received in the grooves, said terminals having heads at their inner ends designed to come into contact with the desired wire and tending to move the wire portion contacted by the head, out of the receptacle in which the terminal is received, and a spring for each looped wire and interconnecting the spaced ends of the wire, whereby each looped wire is yieldingly contracted by its spring for making a yielding contact with the head of the terminal contacting therewith.

WILLIAM L. JACKE.

REFERENCES CITED

The following references are of record in the file of this patent:

UNITED STATES PATENTS

| Number | Name | Date |
| --- | --- | --- |
| 2,019,157 | Rice | Oct. 29, 1935 |
| 2,042,956 | Nelson | June 2, 1936 |
| 2,093,833 | Franklin | Sept. 21, 1937 |
| 2,150,562 | Reid | Mar. 14, 1939 |
| 2,212,386 | Cameron | Aug. 20, 1940 |
| 2,248,144 | Westby | July 8, 1941 |
| 2,337,568 | Owens | Dec. 28, 1943 |

FOREIGN PATENTS

| Number | Country | Date |
| --- | --- | --- |
| 59,004 | Switzerland | Jan. 5, 1912 |